United States Patent [19]

Fujisawa et al.

[11] Patent Number: 5,265,242
[45] Date of Patent: Nov. 23, 1993

[54] DOCUMENT RETRIEVAL SYSTEM FOR DISPLAYING DOCUMENT IMAGE DATA WITH INPUTTED BIBLIOGRAPHIC ITEMS AND CHARACTER STRING SELECTED FROM MULTIPLE CHARACTER CANDIDATES

[76] Inventors: Hiromichi Fujisawa, Kotesashi-haitsu K-510,3-15, Kotesashicho, Tokorozawa-shi, Saitama; Atsushi Hatakeyama, 4-1-2, Hiyoshicho, Kokubunji-shi, Tokyo; Yasuaki Nakano, 5-22-9, Nishihirayama, Hino-shi, Tokyo; Junichi Higashino, 5-20-22, Midoricho, Kogamei-shi, Tokyo; Toshihiro Hananoi, 1-14-19, Fujimigaoka, Ninomiyacho, Naka-gun, Kanagawa, all of Japan

[21] Appl. No.: 139,781
[22] Filed: Dec. 30, 1987

Related U.S. Application Data

[62] Division of Ser. No. 894,855, Aug. 8, 1986, abandoned.

[30] Foreign Application Priority Data

Aug. 23, 1985 [JP] Japan .................... 60-184181

[51] Int. Cl.⁵ .................. G06F 15/401; G06F 15/62
[52] U.S. Cl. ...................... 395/600; 395/145; 364/419.13; 364/DIG. 1; 364/261; 364/261.2; 382/57
[58] Field of Search ............. 364/578, 563, 900, 419; 382/10, 11, 16, 36, 37, 40, 41, 48, 56, 57; 395/600, 144, 145, 147

[56] References Cited

U.S. PATENT DOCUMENTS

| | | | |
|---|---|---|---|
| 3,909,796 | 9/1975 | Kitamura | 364/900 |
| 4,485,454 | 11/1984 | Kimoto | 364/900 |
| 4,553,261 | 11/1985 | Froessl | 382/57 |
| 4,554,631 | 11/1985 | Reddington | 364/300 |
| 4,558,410 | 12/1985 | Holzner et al. | 364/200 |
| 4,574,395 | 3/1986 | Kato | 382/56 X |
| 4,591,974 | 5/1986 | Dornbush et al. | 364/200 |
| 4,616,336 | 10/1986 | Robertson et al. | 364/900 |
| 4,625,295 | 11/1986 | Skinner | 364/900 |
| 4,642,762 | 2/1987 | Fisanick | 364/300 |
| 4,653,021 | 3/1987 | Takagi | 364/900 |
| 4,760,606 | 7/1988 | Lesnick et al. | 382/48 |

OTHER PUBLICATIONS

Chang, P. Y., "Generalized Method of Quick Access to Record Through ID," IBM Technical Disclosure Bulletin, Dec. 1983, pp. 3490-3491.

Primary Examiner—Thomas C. Lee
Attorney, Agent, or Firm—Antonelli, Terry, Stout & Kraus

[57] ABSTRACT

A document storage and retrieval system for storing a document body in the form of image, means for storing text information in the form of a character code string for retrieval, apparatus for executing a retrieval with reference to the text information, and apparatus for displaying a document image relating thereto on a retrieval terminal according to the retrieval result. Such a form of the system is available for retrieving the full contents of a document and also for displaying the document body printed in a format easy to read straight in the form of image. Users are capable of retrieving documents with arbitrary words and also capable of reading even such a document as is complicated to include mathematical expressions and charts through a terminal in the form of image, the same as on paper. A system is provided wherein the text information for retrieval is extracted automatically from the document image through character recognition. Since a precision of the character recognition has not been satisfactory hitherto, a visual retrieval and correction have been carried out without fail by operators. However, there is no necessity for the operators to attend therefor.

4 Claims, 16 Drawing Sheets

FIG. 5

| MAIN-DIR | | | | | | | | | | | | | |
|---|---|---|---|---|---|---|---|---|---|---|---|---|---|
| DOC # | ID | NP | TITLE | AUTHOR | CLASS | PUBL # | VOL | NO | PP | KWD | ABS | TXT | IMG |
| | | | | | | | | | | | | | |

FIG. 6(a)

| TXT-LOC | | | |
|---|---|---|---|
| TXTID | VOLSER | UNIT | |
| | | | |

FIG. 6(b)

| IMG-LOC | | | | 154 |
|---|---|---|---|---|
| IMGID | VOLSER | UNIT | | |
| | | | | |

FIG. 7

| PUBLISHED | | | | | |
|---|---|---|---|---|---|
| PUB # | TITLE | YEAR | PUBLISHER | ADDR | ASSOC |
| | | | | | |

FIG. 19(a)

| | ---- $S_j$ ---- | --- $W_j$ ---- | ---- $T_j$ ---- |
|---|---|---|---|
| $C_1$ | | | |
| $C_2$ | | | |
| $C_3$ | | | |
| ⋮ | | | |
| $C_k$ | | | |
| [ | | | |
| ] | | | |

FIG. 19(b)

| S | A |
|---|---|
| | |
| $S_j$ | $A_i$ |
| | |
| ⋮ | ⋮ |

DOCUMENT RETRIEVAL SYSTEM FOR DISPLAYING DOCUMENT IMAGE DATA WITH INPUTTED BIBLIOGRAPHIC ITEMS AND CHARACTER STRING SELECTED FROM MULTIPLE CHARACTER CANDIDATES

This is a division of application Ser. No. 894,855, filed Aug. 8, 1986, now abandoned.

BACKGROUND OF THE INVENTION

The present invention relates to a document storage and retrieval system for filing documents as an image, and is particularly concerned with a document storage and retrieval system capable of full text searching.

The typical information retrieval system has hitherto provided a retrieval of data chiefly according to a keyword and a classification code. Bibliographic information and patent information have been processed to form a data base by means of the system mentioned above. Mainly bibliographic information including abstracts in its coverage is processed for a data base here, but the situation is such that only a part of its function is realized to cope with the true need of information retrieval. That is, even if a document or patent conceivably relevant is found, there is the need to search among a lot of bookshelves to obtain the text.

Meanwhile, an optical disk capable of storing a mass data has now been available for loading the text in the data base to provide a so-called original document information service, thus coping with a social need. A paperless documentation at the Patent Office is so planned accordingly. In these systems, volumes of documents are stored in optical disks in the form of image data, and a conventional information retrieval technique based mainly on a keyword search is applied.

However, the conventional information retrieval technique is only effective to orders of tens to hundreds, and hence a further technique for squeezing relevant documents to 1/10 in number or so is desired. One method is that in which an original document (text) stored as image data is called onto a terminal and read visually by a retriever. The method is secure in principle, however, documents amounting to hundreds maximumly are too many to read out in the form of image data, and reading one by one visually is not efficient practically as a matter of course.

On the other hand, the conventional method based on the keyword and classification code must be updated all the time for the classification system itself changes as time passes, thus leaving an intrinsic problem. For example, volumes of documents classified already cannot be modified practically as the classification system is subjected to modification later. Documents and patents recording a progress of science and technology are novel in content and hence of value because they provide a new data conception which often is not included in the conventional classification system. For this purpose, it is impossible to define beforehand the keyword and the classification system representing a conception originally, which is a problem essentially for the information retrieval system.

For the reason as mentioned above, it is desirable to provide a method which will retrieve contents with reference directly to the text of a document. According to the method for referring to the text, a retrieval can be practiced by means of a vocabulary recognized as a conception which was not deemed to be important when the document was registered in a data base but is taken new at the point of time of retrieval. Or otherwise, an important document can be searched out directly without a "filter" or an indexer (specialized for giving index) at the time of registration.

To satisfy such a requirement, it is necessary that a character pattern is extracted from the document as an image data and the text is replaced by a character code, and a character recognition technique may be applied therefor. However, a document or a printed document, for example, which is an object for filing is not perfect character recognition from the point of view of diversification of the kinds of print quality and font. In a conventional optical character reader, imperfect recognitions such as error, rejection and the like are subjected to checks and corrections by operators. (For example, "Introduction to Character Recognition" by Hashimoto, Ohm-Sha, 1982, pp. 153–154) Accordingly, even if the recognition precision is extremely high, a method for checking visually a result obtained through recognizing the text is not realistic where the amount of documents is very large, and hence a document filing system with images as the main constituents which is available for text retrieval has not been realized until now.

SUMMARY OF THE INVENTION

An object of the invention is to provide a document storage and retrieval system having a full text retrieval function with reference directly to the text of a document by solving the problems referred to above.

In order to attain the above-mentioned object, the invention the invention stores and retrieves both the document image data and full-text data, where full-text data is used to support the full-text search capability, and the image data is used to present or display the contents of the retrieved documents to the retriever. This system inputs character strings as the retriever's request, and searches for these strings in character strings in the full-text data. By searching for the corresponding image file identifiers in the image file directory, the locations of the corresponding document image data are identified and the retrieved document images are displayed onto the document retrieval terminal.

This system further recognizes the contents of the documents from the image data and stores the resulting text data to support the full-text retrieval capability. To overcome the problem of insufficient character recognition accuracy, the character recognition module of this system outputs multiple candidates of character codes when more than one characters have very high similarity values, thereby avoiding misrecognition. The full-text data so created therefor includes some ambiguity. For example, an ambiguous text is represented as ". . . S[mw] [il] th . . . ", where [mw] represents two character, and "m" and "w" which are the candidates for the recognized character, and [il] represents "i" and "l" which are the candidates having the most similarity. The full-text search mechanism of this system can identify that a substring "Smith" is included in the string documents with high accuracy even from the full-text of the document recognition results.

As shown in FIG. 1, a document 10 is transformed into a notational expression as indicated by 20 in the system according to the present invention. The symbol string used is that provided in languages such as LISP. It follows a notation called S-expression. A process in which the document (image) is transformed into a notational expression 20 is called document understanding or document recognition. The notational expression signifies roughly the following. That is, the document is numbered 99, the class is "Technical Paper", VOL=5, NO=7, the author is named "Peter S[mw] [il]th", the title is "Fu[1l][l1]$\Delta$Text$\neq$[RB]etr[il]e...", the text is "... Fu[l1][l1]$\Delta$Text$\Delta$se[ao]rch..." and so forth. Here, $\Delta$ indicates a blank (space) and so forth.

In the character recognition, that of ambiguity includes, in most cases, a character pattern which can hardly be coped with normally.

For retrieval, meanwhile, a user inputs "FULL$\Delta$TEXT$\Delta$RETRIEVAL" from a keyboard. Generally, there are such languages as will express the same meaning in different words, and in this case "FULL$\Delta$TEX-T$\Delta$SEARCH" has also the same meaning. While handling such ambiguity automatically, the system is capable of searching documents having the same character string.

A plurality of partial character strings to be found out of the sentence to be retrieved are expressed by a finite state automaton as shown in FIG. 2. The title character string which is one of the sentences to be retrieved as exemplified in FIG. 1 can be expressed similarly by the automaton of FIG. 3. In this case, however, there is no distinction between a capital letter and a small letter. The invention provides a text search (character string retrieval) function in case there is present an ambiguity (a plurality of possibilities, or the state wherein elements which cannot be decided identically are present) on both searching key (partial character string) and sentence to be retrieved, which is a third principle.

A method given in a report [by A. V. Aho, et al. "Efficient String Matching: An Aid to Bibliographic Search," Communications of the ACM, Vol. 18, No. 6, 1975] is well known for searching a plurality of partial character strings out of an unambiguous text by the infinite state automaton.

BRIEF DESCRIPTION OF THE DRAWINGS

FIG. 5 is a table of the main directory keeping the bibliographic data;

FIGS. 6(a) and 6(b) together shows tables for storing location information of text data and image data;

FIG. 7 is a table storing publication information;

FIGS. 19(a) and 19(b) together is a state transition table of the extended finite state automaton;

DESCRIPTION OF THE PREFERRED EMBODIMENTS

Figure 4:
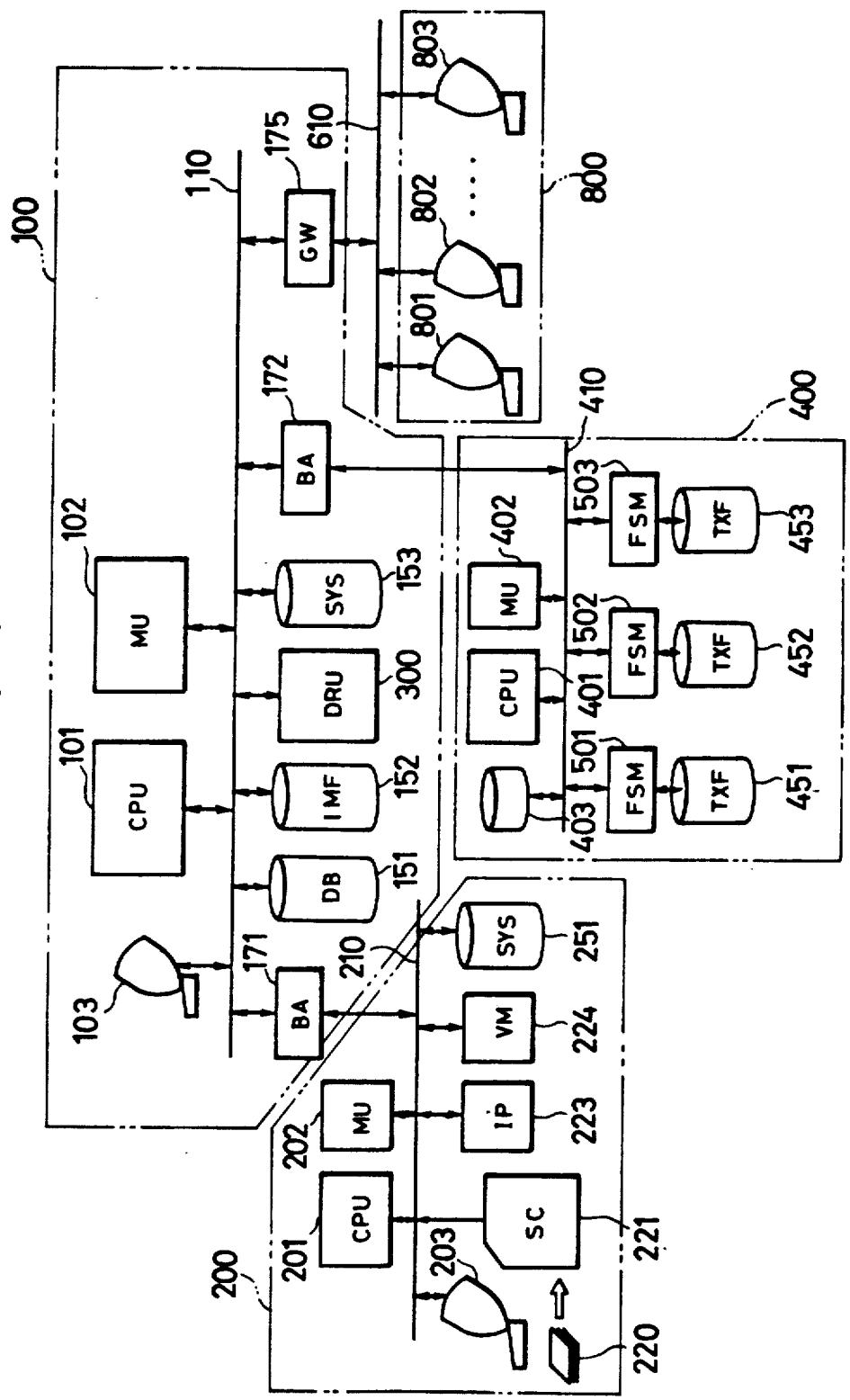
FIG. 4 is a system configuration drawing of a first embodiment.

The invention will now be described with reference to illustrative examples. FIG. 4 is a configuration drawing of a document storage and retrieval system forming one embodiment of the invention. The system comprises a control subsystem 100 providing a general control and a data base function, an input subsystem 200 for inputting a document and others and registering in a file, a document recognizer 300 for recognizing documents, a text search subsystem 400 for carrying out a high-speed text search, and a terminal subsystem 800 for carrying out a retrieval.

A configuration and a flow of operation of each subsystem will be described in detail below.

The input subsystem 200 has a central processing unit (CPU) 201 for controlling the subsystem, a main memory 202, a system file 251 and a terminal 203 as a basic division. The subsystem is controlled by operation from the terminal 203, image on each page of a document 220 is read optically by a scanner 221, and digitized image data is stored first in a video memory 224 by way of a bus 210. The image data is then subjected to a redundant compression on an image processor (IP) 223, transformed into MH (Modified Huffmann) code or MR (Modified Read) code and then returned to another area of the video memory 224.

The inputted document image is displayed on the terminal 203 for confirmation, and the operator is capable of inputting bibliographical items such as the title, author's name, creation data and others while observing the image displayed thereon. As will be described hereinlater, bibliographical items of a formatted document can be read automatically through document understanding, however, bibliographical items of a not-formatted document and items of information which are not entered in paper must be inputted manually. For example, it is natural that a classification code of document contents defined by users and a keyword which is not present on paper should be inputted by the operator. Then, a value and position setting of each document must be arranged independently by a user of the document, which can be inputted from the terminal 203. A data of such bibliographical items and others inputted as above is correlated with an image data (compressed data) in the video memory 224 and is then loaded in the main memory 202.

Here, each document is given a proper number (document ID) and stored in the memory so as to draw image data and bibliographical items using the proper number of the document as a key. The document proper number can be expressed, for example, by coupling an identifier number ('INSYS 01' and the like) of the subsystem to the character string indicating date and time. For example, INSYS01. 850501.132437 indicates a document inputted from an input subsystem INSYS01 at 13 h: 24 m: 37 s on May 1, 1985. There may be a case where the input time is important according to application of the system, and hence it functions as a time stamp otherwise.

Now, whenever a predetermined quantity of the document is accumulated in the subsystem 200 or a predetermined command arrives from the terminal 203, an interrupt signal is sent to a bus adapter 171.

A control subsystem 100, sensing the interrupt signal, reads a predetermined address in the memory 202 of the input subsystem 200. The contents of a request of the input subsystem can thus be decided.

An operation follows as described below upon request of a registration of the inputted document in a data base.

The central processing unit (CPU) 101 is acquainted with the proper number of documents stored temporarily in the input subsystem 200 according to a predetermined program in a main memory 102 and further with a memory address of bibliographical data (bibliographical items) relating thereto and image data.

The control subsystem 100 has a data base file 151 for storing and managing symbolic data such as bibliographical data and the like, and an image file 152 for storing and managing the image data.

The bibliographical data read out of the input subsystem 200 is written as a new record in a data base (loaded in the file 151) which is given in the form of the table in FIG. 5. The table of FIG. 5 is named MAIN-DIR (main directory) and has the following data columns.

| DOC#: | A serial number of document registered in the system |
| --- | --- |
| ID: | A document proper number given by the input subsystem. |
| NP: | A page number constituting the document. |
| TITLE: | A title (character string) |
| AUTHOR: | An author's name (permitting iteration of plural data). |
| CLASS: | A symbol indicating classification, kind and the like of documents. |
| PUBL#: | A number of publication registered in the system (detail being managed on the table shown in FIG. 7.) |
| VOL, NO, PP: | Volume, number, page. |
| KWD: | A plurality of keywords. |
| ABS: | A text proper number of abstract expressed as a character code string (text data). |
| TXT: | A text proper number as a character code string. |
| IMG: | A proper number of image data. Since the image data is managed at every page, a plurality of image proper numbers are recorded. |

In registration of the bibliographical data, only such data of the above columns as will relate partly to the bibliographical data is written newly.

Next, the image on a page constituting each document is read to the control subsystem 100 from a predetermined storage area of the input subsystem and is then stored sequentially in an empty area of the image file 152. Each image (page unit) is concurrently given an image proper number (IMGID). Then, a volume number (VOLSER) of the file having loaded the image data therein, a file unit number (UNIT), a loading physical address (PHYSA) in the file, a record length (SLENG) in the file and others are written in tables shown in FIG. 6(a) and FIG. 8. The image proper number INGID given newly is also recorded in IMG column of the table MAIN-DIR (FIG. 5).

Here, a table IMG-LOC shown in FIG. 6(b) is particularly effective when the image file 152 is constituted of a plurality of driving devices or a plurality of volumes, managing the location of each image. As a matter of course, it is updated at every operations for demounting and mounting the volume by operators.

Figure 8:
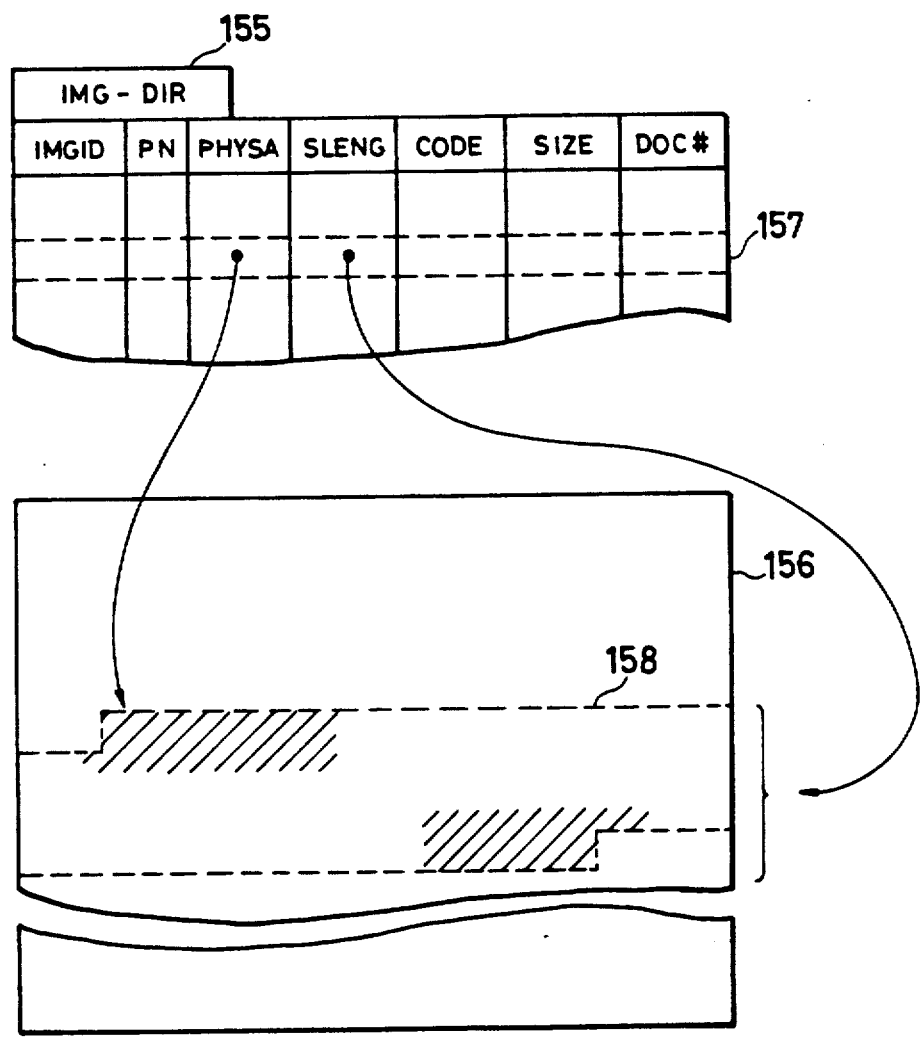
FIG. 8 shows an image file directory and its relationship with the body file.

Then, FIG. 8 shows a directory provided at each volume of the image file 152, and the following columns are provided therein.

| IMGID: | An image proper number. |
| --- | --- |
| PN: | A serial page number (1 to n) in a document. |
| PHYSA: | A physical address in a volume. |
| SLENG: | A record length (sector number, for example). |
| CODE: | An image compression code name. |
| SIZE: | An image size (pixel number). |
| DOC#: | A document serial number. |

Then in the drawing, data in the column PHYSA of a record 157 indicates a leading address of an image data 158 in an image data area 156 in the image file.

Now, whenever the above operations come to end, the system is ready for retrieving the bibliographical items and the keyword from the terminal group 800.

A retrieval condition inputted from the retrieving terminal is transmitted to the CPU 101 of the control subsystem 100 by way of a gateway 175. A retrieval of a table MAIN-DIR (FIG. 5) in the data base file 151 is carried out according to a predetermined retrieving program of the memory 102. It goes without saying that indexing (for high-speed retrieval such as hashing, inverted file and the like) is applied to main columns of the table MAIN-DIR.

As a result of retrieving, a list of DOC#from the table MAIN-DIR (FIG. 5) and a list of image proper number IMGID are made out and stored in a predetermined area of the memory 102. Upon request for display from the retrieving terminal, a position in the image file is identified by means of a table IMG-LOC 154 (FIG. 6(b)) and a table IMG-DIR 155 (FIG. 8), and the image data is read successively onto the memory 102. The image data thus read out is transmitted to the retrieving terminal in turn and then displayed on a screen according to an indication on the terminal.

A managing method for the text used for full text retrieval will be described, next.

As described in the main directory MAIN-DIR (FIG. 5), each document is stored and managed not only for image data but also for text expressed in a character code string. In the example, the abstract and the text are stored and managed in text files 451, 452, 453 as a text. Each text (character string) is given a proper text number and recorded in columns ABS and TXT of the table MAIN-DIR (FIG. 5), a column TXTID of the table TXT-LOC shown in FIG. 6(a), and a column TXTID of the table TEXT-DIR shown in FIG. 9.

Figure 9:
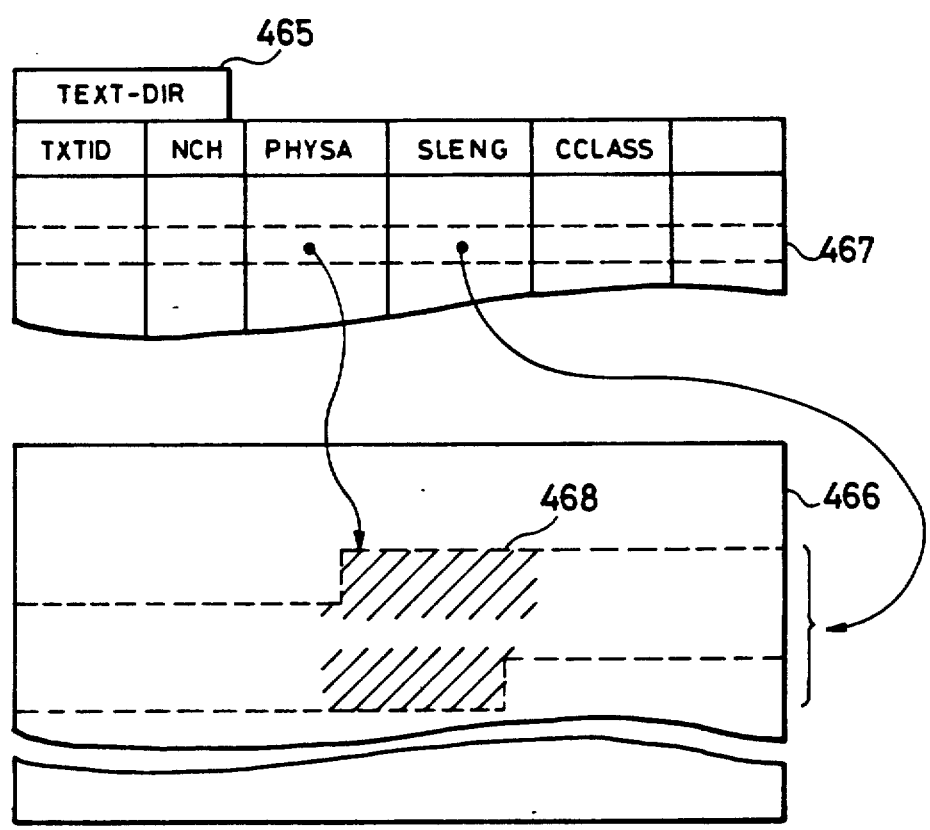
FIG. 9 shows a text file directory and its relationship with the body file.

FIG. 9 indicates a method for storing and managing texts in the text files 451, 452, 453. In the drawing, a text body is stored one-dimensionally in a file storage area 466. Each text (one character string) is given a proper number TXTID and managed in a directory table TEXT-DIR 465.

| | |
|---|---|
| TXTID: | A text proper number. |
| NCH: | A total number of characters constituting the text. |
| PHYSA: | A physical address in which the text is recorded. |
| SLENG: | A record length on a storage medium of the text. |
| CCLASS: | A class of characters expressing the text (Chinese character-mixed Japanese statement, English statement, Roman character, kana character and others). |

A record 467 of the table 465 indicates that the text expressed by the record is a portion 468 in the storage area in the file.

On the other hand, as shown in FIG. 4, the text can be recorded in a plurality of volumes, and the text directory is that of managing the text in each volume. When the plural volumes are mounted, it is necessary that a presence of a text in any of the volumes be known, and the table TXT-LOC shown in FIG. 6(a) manages the location of each text. A volume serial number VOLSER in which the text having the text proper number TXTID is recorded, and a file unit number UNIT in which the volume is mounted is managed. TXT-LOC will be updated automatically as a matter of course when a physical volume is demounted or newly mounted by operators.

Then, when input of document images, input of bibliographic items and registration of documents are over as a flow of big operation, a text recognition (document understanding) of the registered document is carried out by the document recognition apparatus 300. An input of the recognition apparatus is the document image 10 shown in FIG. 1 in an image file 152, and a recognition result output is a notational expression 20 shown likewise in the drawing. A text portion of the abstract and the text in the notational expression 20 is stored newly and so managed by the text files 451 to 453 as described hereinabove.

Figure 10:
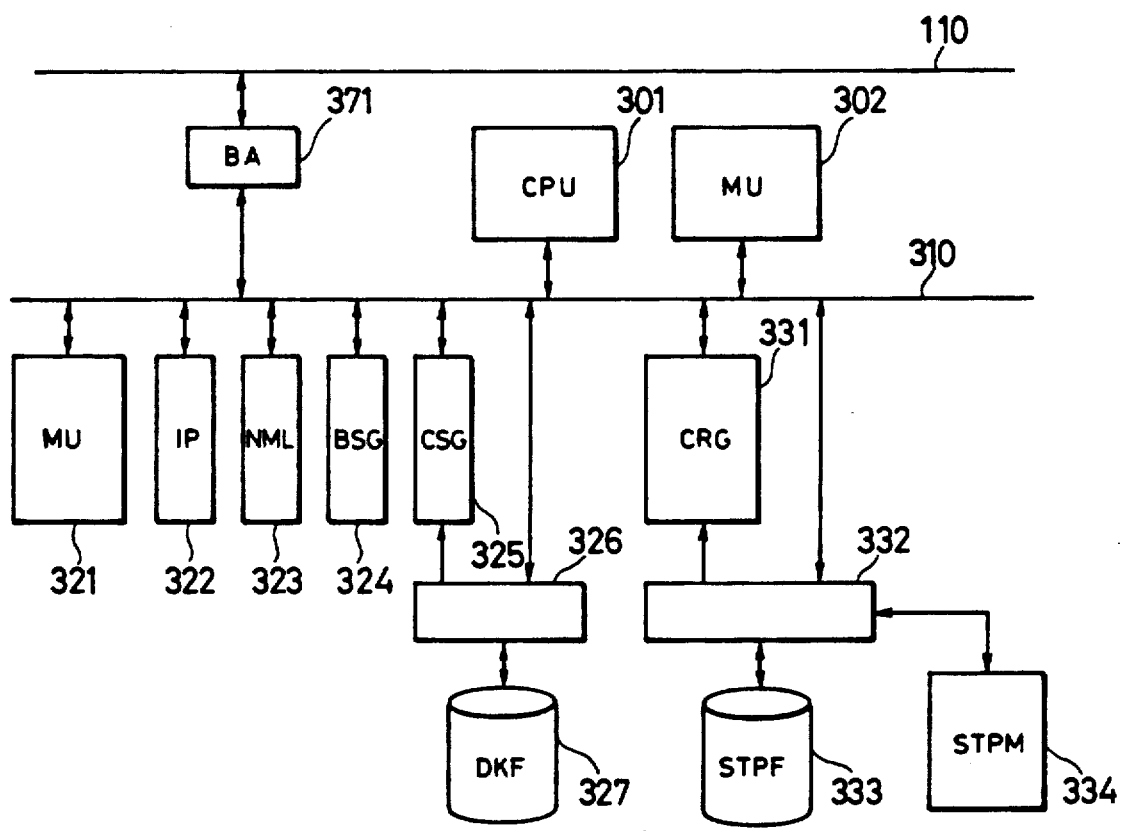
FIG. 10 is a block diagram of a document recognizer.

The document recognition will be described with reference to a detailed block diagram of the document recognition apparatus shown in FIG. 10.

The recognition apparatus 300 is connected to a bus 110 of the control subsystem 100 through a bus adapter 371 and controlled by CPU 301. A memory 302 stores data of a program and a parameter for controlling operation of the apparatus.

An image data to be recognized is transmitted from the image file 152 to a memory 321. The image data is coded through compression, decoded to a bit expression image by an image processing circuit IP 322 and is again stored in the memory 321. Then consecutively, a contour extraction of the pattern is carried out by the IP 322 from the image decoded to a bit expression, and a result of extraction is again loaded in the memory 321.

Figure 11:
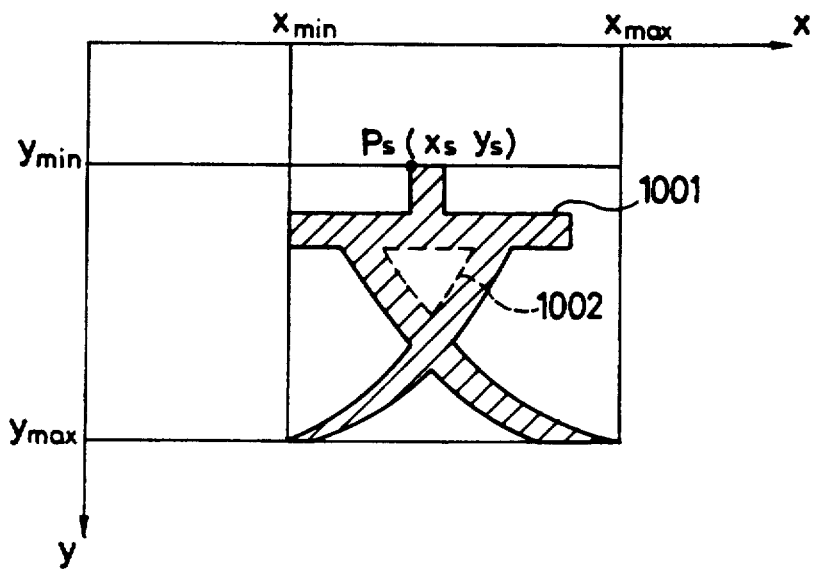
FIG. 11 is an explanatory drawing of a rectangular area surrounding a character pattern.
Figure 12:
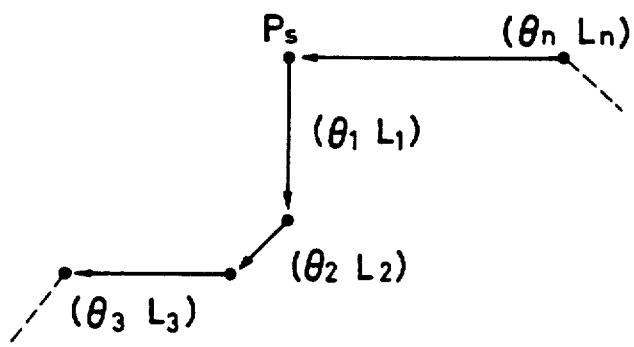
FIG. 12 is a drawing illustrating a contour expression method for describing a pattern.

The extracted contour data is expressed as follows:

$$(i\ C_i\ x_{max,i}\ x_{min,i}\ y_{max,i}\ y_{min,i}\ x_{si}\ y_{si}\ (\theta_{1i}\ L_{1i})\ldots(\theta_{ni}\ L_{ni})) \quad (1)$$

where i represents a contour proper number (1, 2, 3, ...), and $C_i$ represents a class of the contour. Then, $C_i=0$ represents an outer contour (a full line 1001 in FIG. 11), and $C_i=1$ represents an inner contour (a broken line 1002 in FIG. 11). Those $x_{max}, x_{min}, y_{max}, y_{min}$ represent a coordinate of the vertex of an outer quadrangle of the contour, each, as shown in FIG. 11. Further, $(x_s, y_2)$ is a coordinate of one point Ps of the contour length (or, for example, the point found first by contour retrieval). With the point Ps as an origin, as shown in FIG. 12, the contour data itself is expressed by rows of sets of a quantized direction code $\theta$ and a pixel number L with the same direction continuing therefor.

Next, an inclination correction circuit 323 detects a tilt angle arising at the time of document input from the contour data given by the expression (1), corrects the contour data accordingly and then rewrite it to the memory 321. For example, a system disclosed by the inventor in Japanese Patent Application No. 152210/1985 may be employed for the inclination correction algorithm.

From a portion of the contour data corrected for inclination ($x_{max}, x_{min}, y_{max}, y_{min}$), a raw segmentation and a column segmentation are carried out on a bottom-up segmenter (BSG) 324.

The bottom-up segmenter BSG inputs the data expressed in the form of expression (1), generates a pattern list given by the expression (2) and loads it in the memory 321.

$$(j\ x_{max,j}\ x_{min,j}\ y_{max,j}\ y_{min,j}) \quad (2)$$

Figure 13:
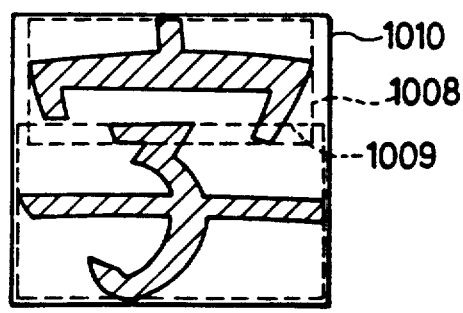
FIG. 13 is a drawing illustrating a relation between pattern components and character pattern.
Figure 14:
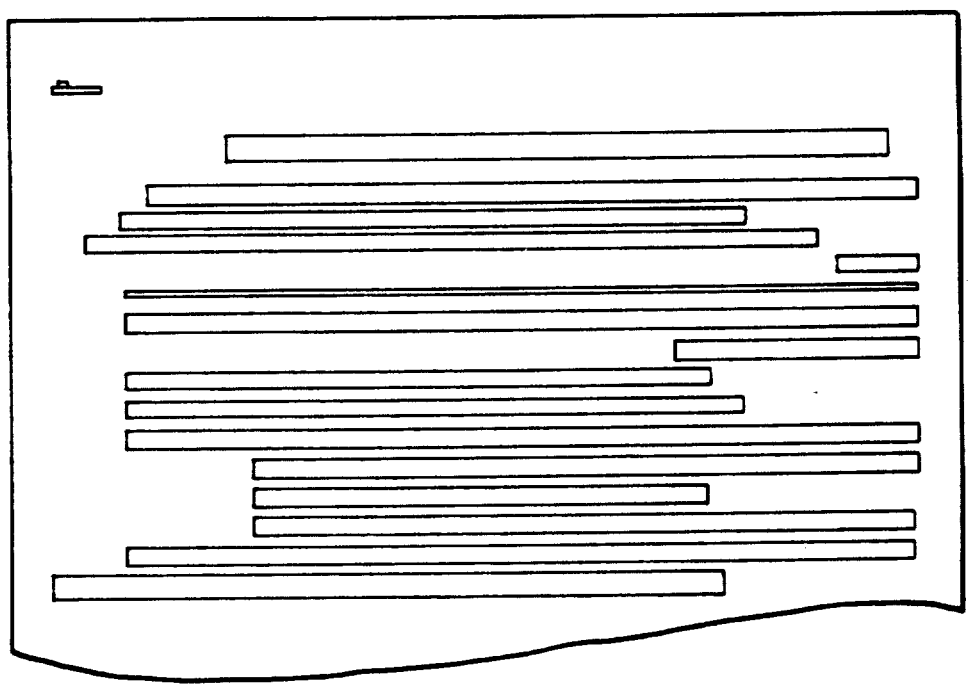
FIG. 14 and FIG. 15 are drawings showing a result of segmenting rows and columns respectively by means of a bottom-up segmenter.
Figure 15:
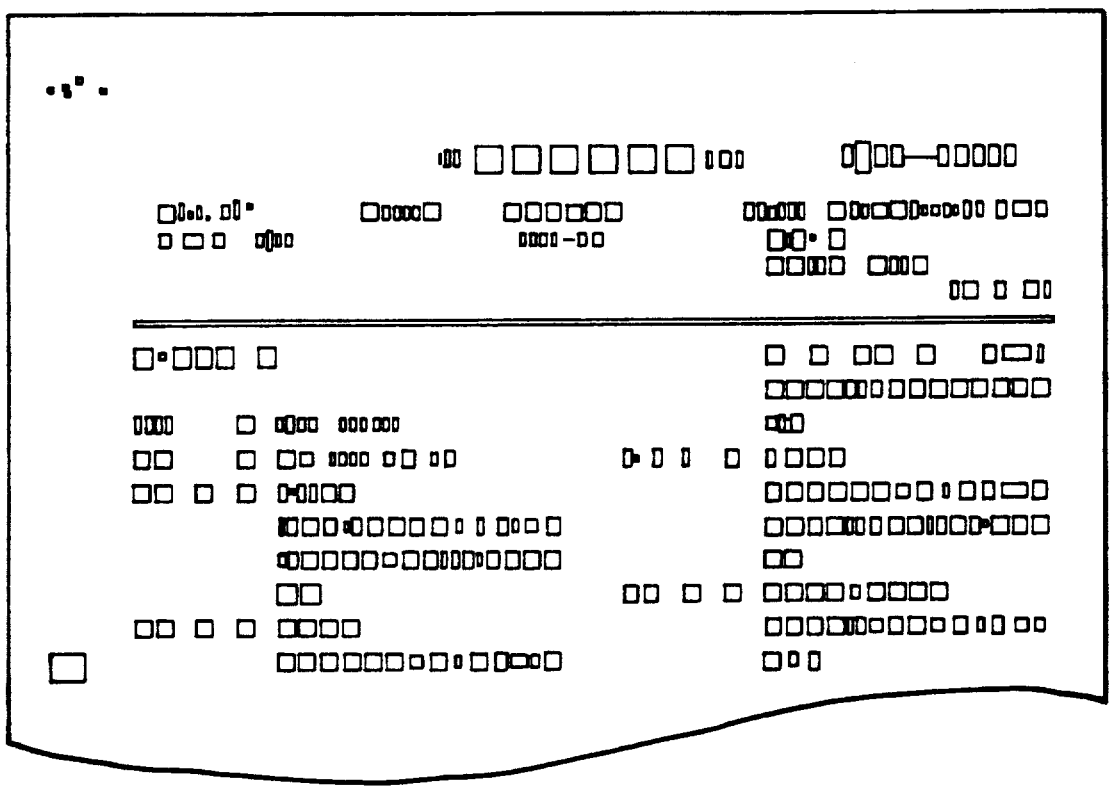

Here, j represents a pattern proper number, the pattern is defined as a rectangular area not overlapping mutually, and the expression (2) further defines vertex coordinates of the rectangular area. For example, rectangular areas 1008, 1009 indicated by broken lines in FIG. 13 are inputs of the BSG, however, a rectangle 1010 is obtainable through the BSG. The rectangles 1008, 1009 are made of one contour each to be an element, and the rectangle 1010 is a pattern forming one character. An element constituting the pattern j is obtainable through searching the rectangle included in a rectangular area defined by the expression (2) from the contour data of the expression (1). It can be obtained separately and loaded as data. A result of row segmentation and another result of column segmentation are shown diagrammatically in FIG. 14 and FIG. 15 respectively.

A character segmentation division (CSG) 325 extracts the pattern constituting a character from the above pattern list with reference to a document knowledge arranging regulations such as document form and the like. As shown in FIG. 10, the document knowledge is loaded in a document knowledge file (DKF) 327.

Structural regulations of the layout of such as a title, author's name, author's belonging, abstract, text and the like are stored according to each kind of documents in the document knowledge file together with a parametric knowledge such as the size of font. The knowledge is described in a format description language. The language disclosed in Japanese Patent Application No. 122424/1985 may be used as a format description language.

The character segmentation division CSG operates for integration of a pattern constituting one character which has been divided into two patterns or more or, to the contrary, for compulsory separation of two or more characters which has been fused through contact into one pattern.

The character segmentation division CSG outputs the number of the patterns constituting each character in a list for each item such as the title, abstract or text as the result of processing. For example:

(ABSTRACT

-continued $$"j_1 j_2 j_3 \cdots [j_n j_{n+1} j_{n+2}] \cdots j_N" \quad (3)$$

represents that the abstract is constituted of a string of characters expressed by a pattern number $j_k$. Here, $[j_n j_{n+1} j_{n+2}]$ represents that the character can be any of three patterns $j_n, j_{n+1}, j_{n+2}$.

A character recognition division (CRG) 331 extracts the contour data constituting each character pattern, as described hereinabove, from the above-mentioned pattern list (expression (3), for example) and the contour data (given by expression (1)) on the memory 321, and transforms it into a data structure ready for feature extraction.

Since a known art may be employed as the character recognition technique, a detailed description will be omitted here, however, after a feature is extracted from the contour data, each character can be recognized through a pattern matching with the standard pattern in a standard pattern file 333. In FIG. 10, a memory STPM 334 is one for storing a standard pattern with high reference frequency, aiming at a high-speed processing.

Figure 1:
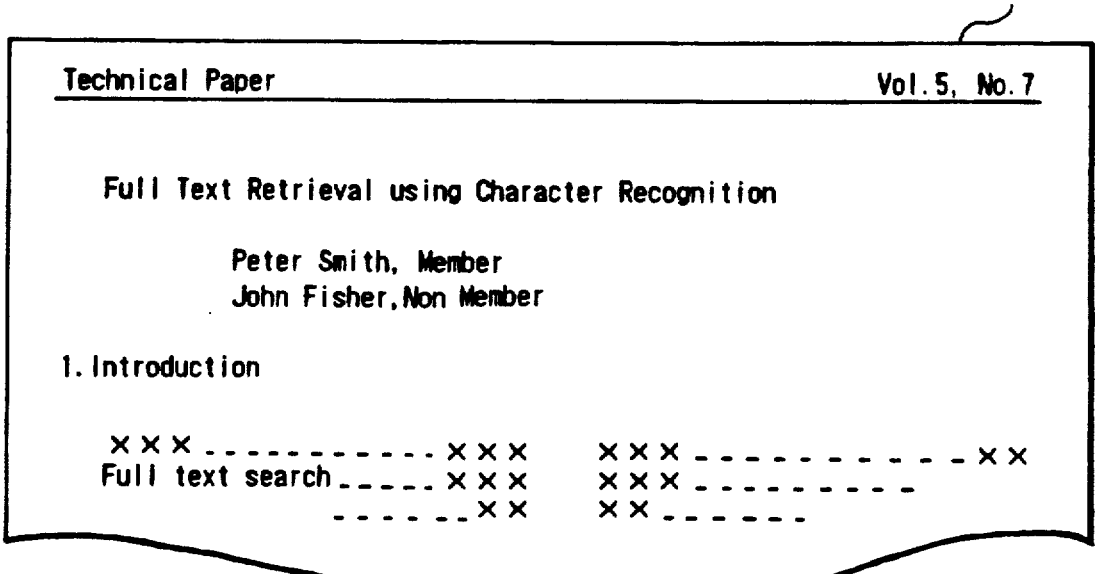
FIG. 1 is a drawing showing a document image and a result of document understanding.
Figure 1:
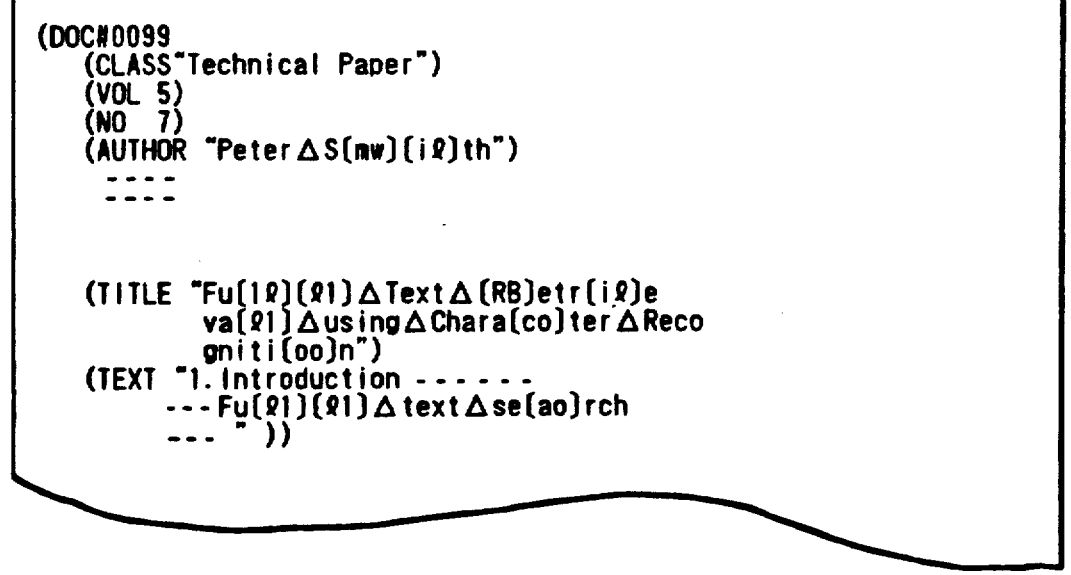

The result of the character recognition is output, as described hereinabove, by the notational expression 20 shown in FIG. 1. In the process of final decision in the character recognition, when a similarity obtained as a result of pattern matching satisfies an expression (4), a character category (character code) $\omega_k$ for giving the similarity is output.

$$\begin{array}{l} \rho_k \geq \rho_l \\ \min \\ (\rho_k - \rho_l) \geq \epsilon \\ k \neq l \\ \text{for } l = 1, 2, \ldots, K \end{array} \quad (4)$$

where $\rho_k$ is a similarity to the character category k, k is a total category number, and $\epsilon$ is a relative threshold.

If the expression (4) is not satisfied, then an aggregation of the character category $\{\omega_k | k = k_1, k_2, \ldots\}$ satisfying an expression (5) is output within two special character codes. For example, a character (code) string $\omega_s \omega_{k1} \omega_{k2} \ldots \omega_e$ is output. Here, $\omega_s$ represents "[", and $\omega_e$ represents "]".

$$\begin{array}{l} \rho_k \geq \rho_l \text{ for } l = 1, 2, \ldots, K \\ \rho_k - \rho_{ki} \leq \epsilon_1 \\ k_i \{1, 2, 3, \ldots, K\} \end{array} \quad (5)$$

In case a similar character is present and the expression (4) is not satisfied by the above processing, a recognition result "FU[L1][L1]ΔTEXTΔSEA [RB]CH" is obtainable, for example, in response to the input pattern "FULLΔTEXTΔSEARCH". The recognition result is buffered on the memory 321 and then transmitted to the memory 102 (FIG. 4) collectively.

In the control subsystem 100, a maximum text proper number is detected with reference to the table TXT-LOC (FIG. 6), and a character code string (text) of the recognition result is registered with a value added by 1 as a new text proper number. The registration is carried out with respect to the main directory 153, the table TXT-LOC and the table 465 (FIG. 9), and the text data itself is loaded in any of the text files 451 to 453.

Now, the document to which a text data is given as above is ready for retrieving using the text search subsystem 400.

Next, the text search subsystem 400 for retrieving text contents and its operation will be described in detail.

A request for text content retrieval or ABS = "TEXTΔRETREIVAL", for example, which is so made from the terminal 800 is transmitted first to the control subsystem 100. In the subsystem 100, where the document to be retrieved has already been narrowed down through keyword retrieval or other means, a proper number of the text incidental to the document is selected from the main directory MAIN-DIR 153, and an expression (6) for the list of proper numbers of the texts to be retrieved is made out according to each text file with further reference to the table TXT-LOC.

$$(u_i \, v_i \, (t_{i1} t_{i2} \ldots t_{in})) \text{ptm} \quad (6)$$

$i = 1, 2, \ldots, M$ where $u_i$ is an i-th file unit number, $v_i$ is a volume serial number, $t_{ik}$ is a k-th text proper number to be retrieved on the volume. Then, M is a maximum number of the text file unit.

On the other hand, when the document to be retrieved has not been narrowed, a special symbol (expression (7), for example) is sent to the whole text file.

$$(u_i \, v_i \, *) \, i = 1, 2, \ldots, M \quad (7)$$

The expression (6) or (7) and the partial character string ("TEXTΔRETRIEVAL", for example) are transmitted to a memory 402 of the text search subsystem 400 by way of a bus adapter 172.

In the subsystem 400 (FIG. 4), a hetero-notation generation processing and a synonym processing of the transmitted partial character string are carried out according to a predetermined program in the memory 402. A hetero-notation generation convention and a thesaurus are stored in a file 403.

"TEXT SEARCH" will further be obtainable through referring to the thesaurus. Further, with reference to the hetero-notation generation, a method disclosed in Japanese Patent Application No. 150176/1985 may also be employed.

As the result of the above-mentioned processing, an aggregation of character strings ("TEXTΔRETRIEVAL" "TEXTΔSEARCH") is obtainable, after all, to "TEXTΔRETRIEVAL". This is indicated by an expression (8).

$$(A_1 \ldots A_i \ldots A_n) = \begin{pmatrix} "a_{11} a_{12} \ldots a_{1m1}" \\ \cdot \\ \cdot \\ \cdot \\ "a_{i1} a_{i2} \ldots a_{imi}" \\ \cdot \\ \cdot \\ \cdot \\ "a_{n1} a_{n2} \ldots a_{nmn}" \end{pmatrix} \quad (8)$$

where n is a number of character strings, $m_i$ is the length of an i-th character string, $a_{ij}$ is a character code j-th from the lead of an i-th character string $A_i$.

Figure 2:
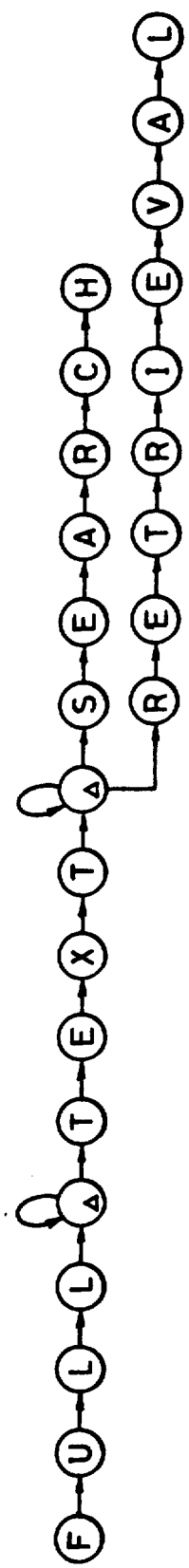
FIG. 2 is a state transition diagram of a synonymic character string generated from a partial character string.
Figure 3:
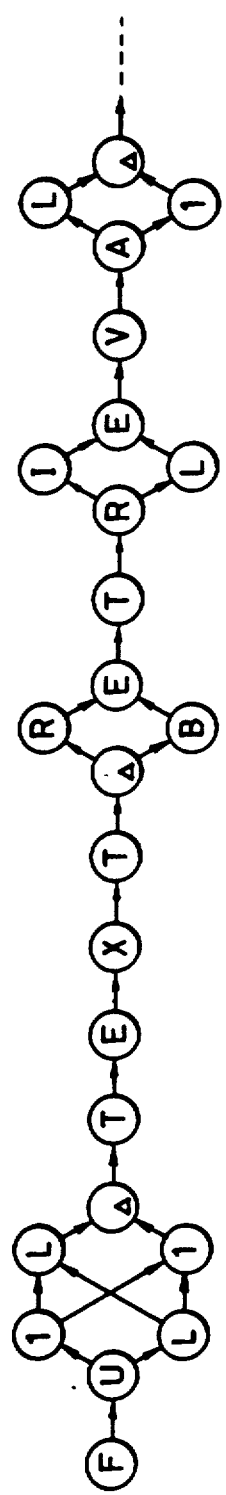
FIG. 3 is a state transition diagram of a character string as a result of character recognition which includes ambiguity.

The subsystem 400 further transforms the expression (8) representing the character string aggregation into a state transition list (9) representing the finite automaton illustrated in FIG. 2 according to a predetermined program.

$$\text{a list} = ((S_{j1}\ C_{k1}\ S_{l1}) \quad\quad\quad\quad (9)$$
$$\vdots$$
$$(S_{ji}\ C_{ki}\ S_{li})$$
$$\vdots$$
$$(S_{jm}\ C_{km}\ C_{lm}))$$

where each element of the list a list (9) implies that when the character $C_{ki}$ is inputted (or coincides therewith) in the state $S_{ji}$, the state can be transmitted to the state $S_{li}$. Then in the expression, those which are equal to each other are included in $\{S_{ji}, \ldots, S_{ji}, \ldots, S_{jm}\}$.

Further, an output list (10) expression is generated.

$$\text{O list} = ((S_{j1}\ A_{i1}) \quad\quad\quad\quad (10)$$
$$\vdots$$
$$(S_{jp}\ A_{ip})$$
$$\vdots$$
$$(S_{jn}\ A_{in}))$$

where $(S_{jp}\ A_{ip})$ implies that the character string $A_{ip}$ is found at the point of time when reaching the state $S_{jp}$.

Figure 16:
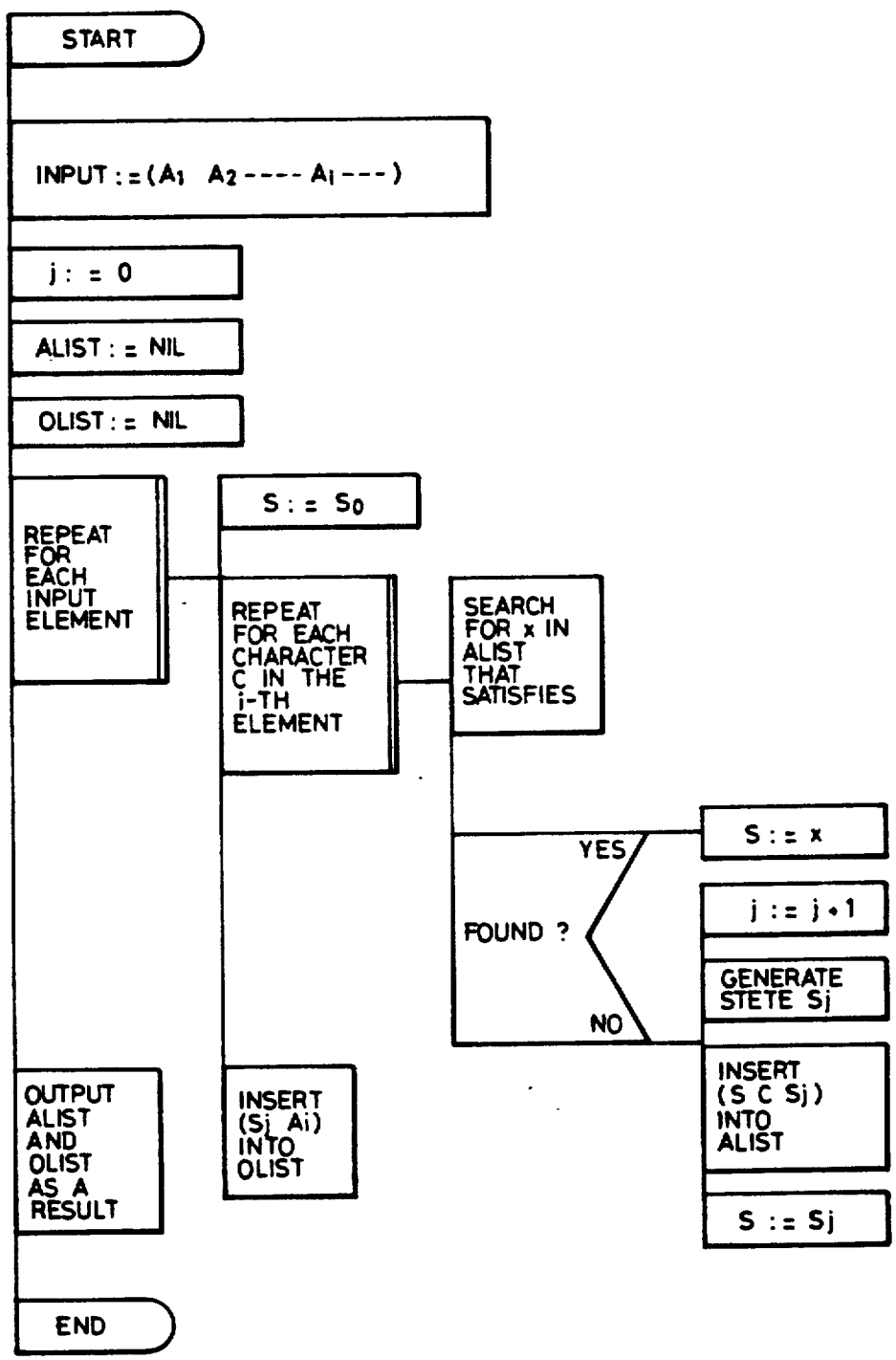
FIG. 16 is an explanatory drawing of an algorithm for obtaining a state transition list from a character string aggregation.

FIG. 16 shows a PAD (program analysis diagram) of the algorithm for deriving the state transition list (9) and the output list (10) from the character string aggregation (8) expression.

Next, a failure transition list (11) expression is obtained from the state transition list (9).

$$f\text{ list} = ((S_o\ S_{jo})\ldots(S_m\ S_{jm})) \quad\quad\quad (11)$$

The element $(S_m\ S_{jm})$ of f list specifies transition of the character $C_k$ inputted in the state $S_m$ to the state $S_{jm}$ with reference to f list when the state to be transmitted is not specified in a list (9) expression. It may be called generally a failure function.

The f list is provided so as to cope with the case where a reinitialization of the state to $S_o$ is generally not correct when a matching is successful halfway of a character string but the next character does not coincide in the partial character string matching, i.e., a destination of the predetermined state transition is not found. For example, a retrieval of two partial character strings "CHARACTERΔRECOGNITION" and "OP-TICALΔCHARACTERΔREADER" is assumed. Supposing a sentence reading ". . . OPTICALΔ-CHARACTERΔRECOGNITION . . . " is inputted, a portion up to "OPTICALΔCHARACTERΔRE" coincides with the second partial character string but the next character "C" is not for matching. Here, if the state is returned to $S_o$ to resetting, the automaton processes the ensuing sentence "COGNITION . . . " as input characters, therefore the partial character string "CHA-RACTERΔRECOGNITION" will be overlooked after all. Accordingly, the state to be transmitted in the case of failure matching is not $S_o$, but the state must stand as matching a transition pass "CHARACTER-ΔRE" of the first character string "CHARACTER-ΔRECOGNITION".

Then next, the subsystem 400 transmits the state transition list, a list, the output list, o list, and the failure transition list, f list, made out as described above to lower flexible string matching circuits FSMs 501 to 503.

Figure 17:
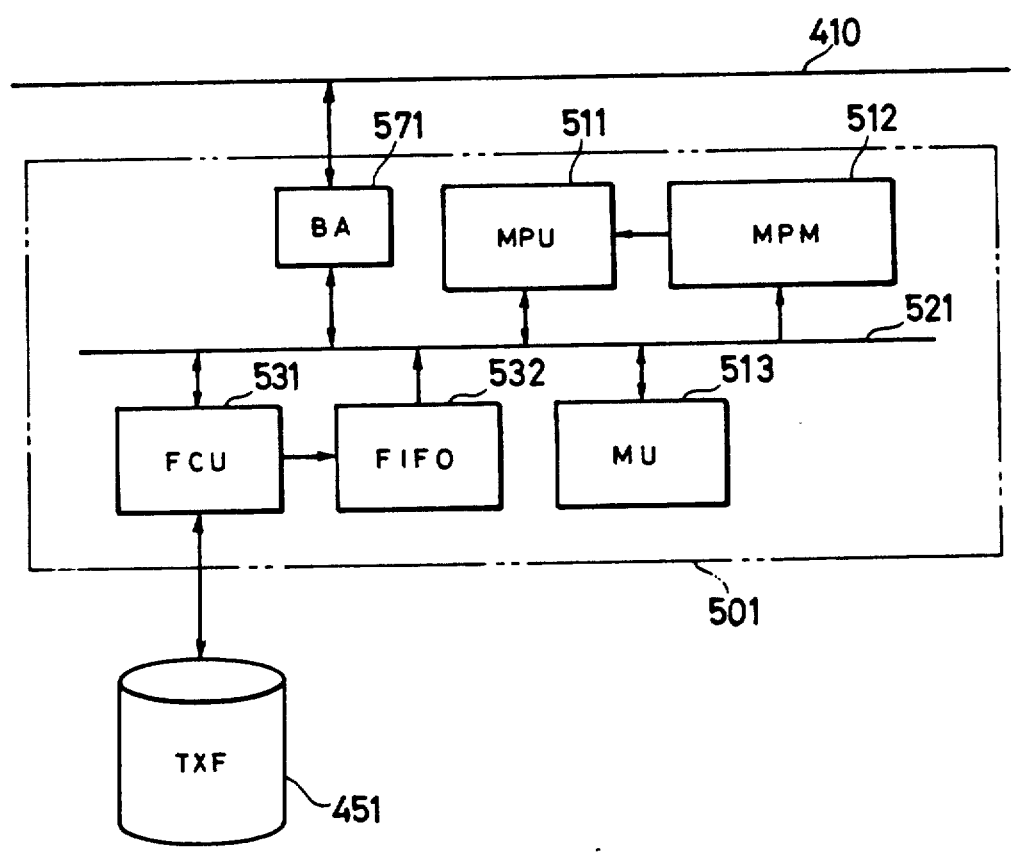
FIG. 17 is a block diagram of a flexible string matching circuit.

A further detailed block diagram of the flexible string matching circuit 501 is shown in FIG. 17. (The block diagram applies likewise to FMSs 502, 503.)

The above-described three lists, a list, o list and f list, are loaded in predetermined areas of a memory 513 by way of an adapter 571. A microprocessor 511 generates an extended finite automaton shown in FIG. 18(b) in the form of state transition matrix on the above information according to a predetermined microprogram.

Figure 18A:
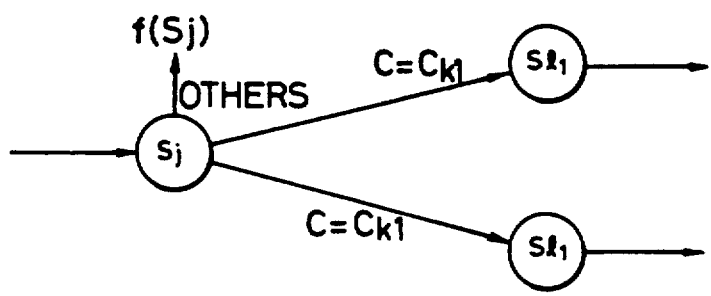
FIGS. 18(a) and 18(b) together is an extended finite state automaton permitting an ambiguous character string.

The finite automaton that the lists, a list and f list, directly imply has a simple form as shown in FIG. 18(a). The drawing illustrates two transitions $$\left.\begin{array}{l}(S_j\ C_{k1}\ S_{l1})\\(S_j\ C_{k2}\ S_{l2})\end{array}\right\} \quad\quad\quad (12)$$

in the a list.

Figure 18B:
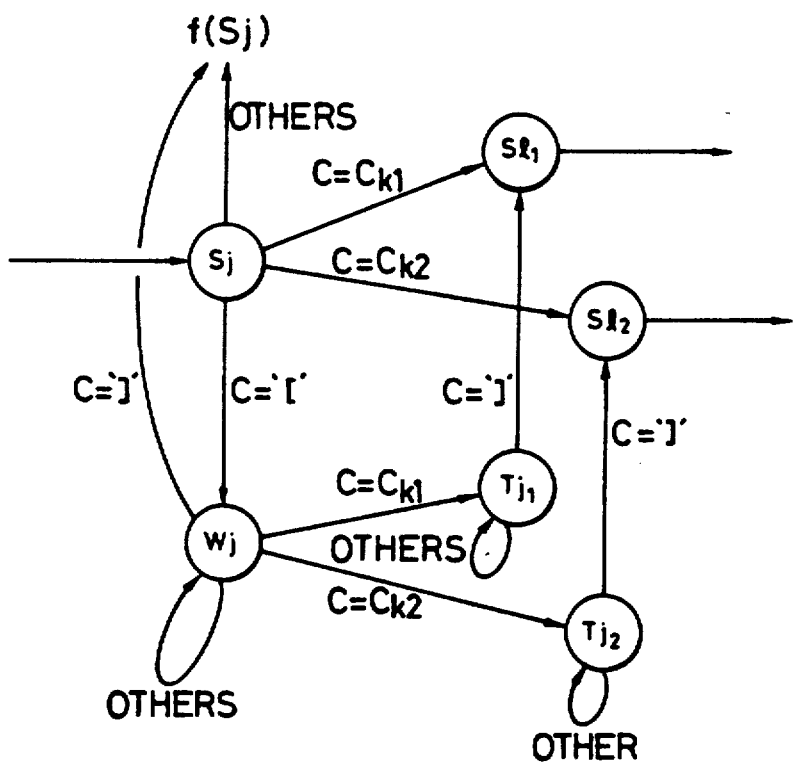

The microprocessor 511 extends and transforms the finite automaton shown in FIG. 18(a) to the one as shown in FIG. 18(b). The transformation is determined identically. A predetermined partial character string can be searched from the ambiguous text to be retrieved according to the transformation. Here, in the drawing, $f(S_j)$ is a failure function made out of the failure transition list f list, indicating a state of the destination of transition when failing in matching at the sate $S_j$. Then, the state $W_j$ corresponds one-to-one to the state $S_j$, scanning the ambiguous character string (given within symbols [j]). Further, the states $T_{j1}$, $T_{j2}$ are states coming out of the state $W_j$ correspondingly to a transition from the state $S_j$, indicating that the character being retrieved ($C_{k1}$ or $C_{k2}$ in the drawing) has been found in the ambiguous character string.

Figures 19A, 19B:
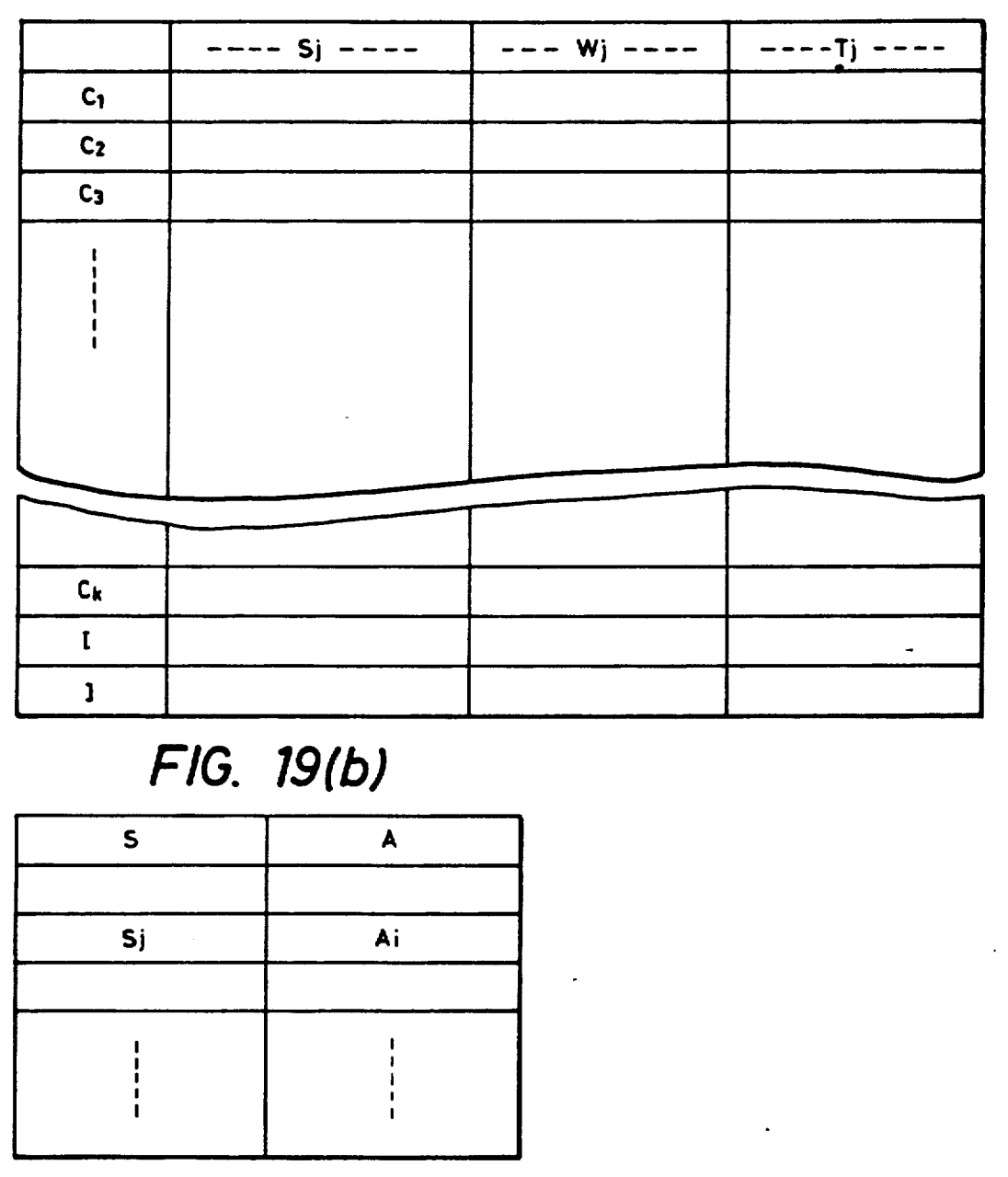

Practically, the microprocessor 511 is capable of generating the state transition table shown in FIG. 19(a) directly from the two lists, a list and f list. A column (vertical) in the state transition table indicates a current state, and a row (lateral) corresponds to a character (code) inputted under the state. The state to transit next is written in the table. Since the algorithm for generating the state transition table will be analogized easily from illustration according to FIG. 18, a further description is omitted.

The microprocessor 511 further transforms the output list, o list, into the form of an output table shown in FIG. 19(b) and records it in a predetermined area of the memory 513 together with the state transition table.

A string search algorithm using the finite state automaton is given as below.

String Search Algorithm

```
begin
γ = 'false';
S: = S_o;
While not eof do
begin
```

```
read (c);
S: next (c, S);
if out (S) < > nil
   then γ: = 'true';
   end;
end;
```

Here, the function next (c, S) is one for obtaining the next state from the state transition table shown in FIG. 19(a) on the character c and the current state S. Further, the function out (S) is one for deciding whether or not an output is present on the state S with reference to the output table shown in FIG. 19(b).

Then, the state is assigned to a unit of one character code in the above description, however, in case the one character code is 2 bytes like Japanese, it is divided into 1 byte each and then the above-described method can be applied thereto.

Figure 20:
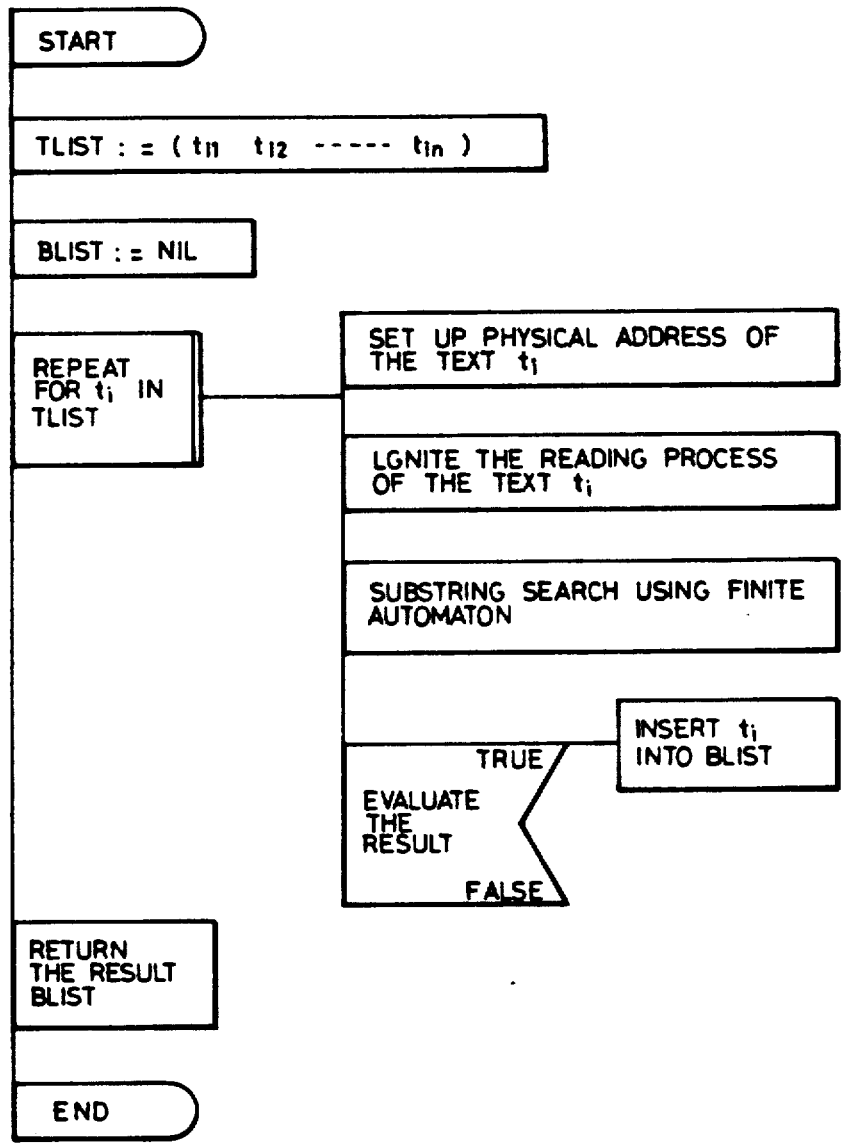
FIG. 20 is a drawing illustrating a program of FSM circuit.

Next, the text search subsystem 400 accepts the lists (6) expression and (7) expression of the proper numbers of texts to be retrieved, and transmits them to the corresponding FSM as text proper number lists to be retrieved at each FSM. Accordingly, if there exists an object to search in the corresponding text file, each FSM obtains the proper number list $(t_{i1}\ t_{i2}\ t_{i3}\ \ldots\ t_{in})$. The text proper number list is loaded in the memory 513 (FIG. 17). The microprocessor MPU 511 detects a physical address of each text according to a predetermined program (FIG. 20) in a microprogram memory 512. The text proper number and the physical address are managed by TEXT-DIR illustrated in FIG. 9, and the table can be read out of the file 451 and thus detected.

The microprocessor 511 then reads each text data out of the file 451. A file control division 531 inputs text data (character string) thus read out successively to an FIFO (first-in-first-out) circuit 532. The microprocessor MPU 511 reads characters one by one out of FIFO 532 and verifies whether or not a predetermined partial character string is present according to the finite automaton (FIG. 18(b)) defined in the memory 513. A string matching result b list (FIG. 20) is returned to the memory 402 of the upper processor.

CPU 1 arranges text proper number lists with retrieval conditions coincident with each other which are sent back from a plurality of lower FSM's into one according to a predetermined program and transmits them further to the memory 102 in the upper control subsystem. A document proper number DOC# with partial character strings matched therefor and a proper number of a document image IMGID or a title TITLE can be identified from the text proper number by referring to the main directory 153 (FIG. 5).

The retrieval results are sent back to the terminal 800. Users are capable of calling the image of a desired document to a CRT to display thereon while observing the title and others on the CRT.

Figure 21:
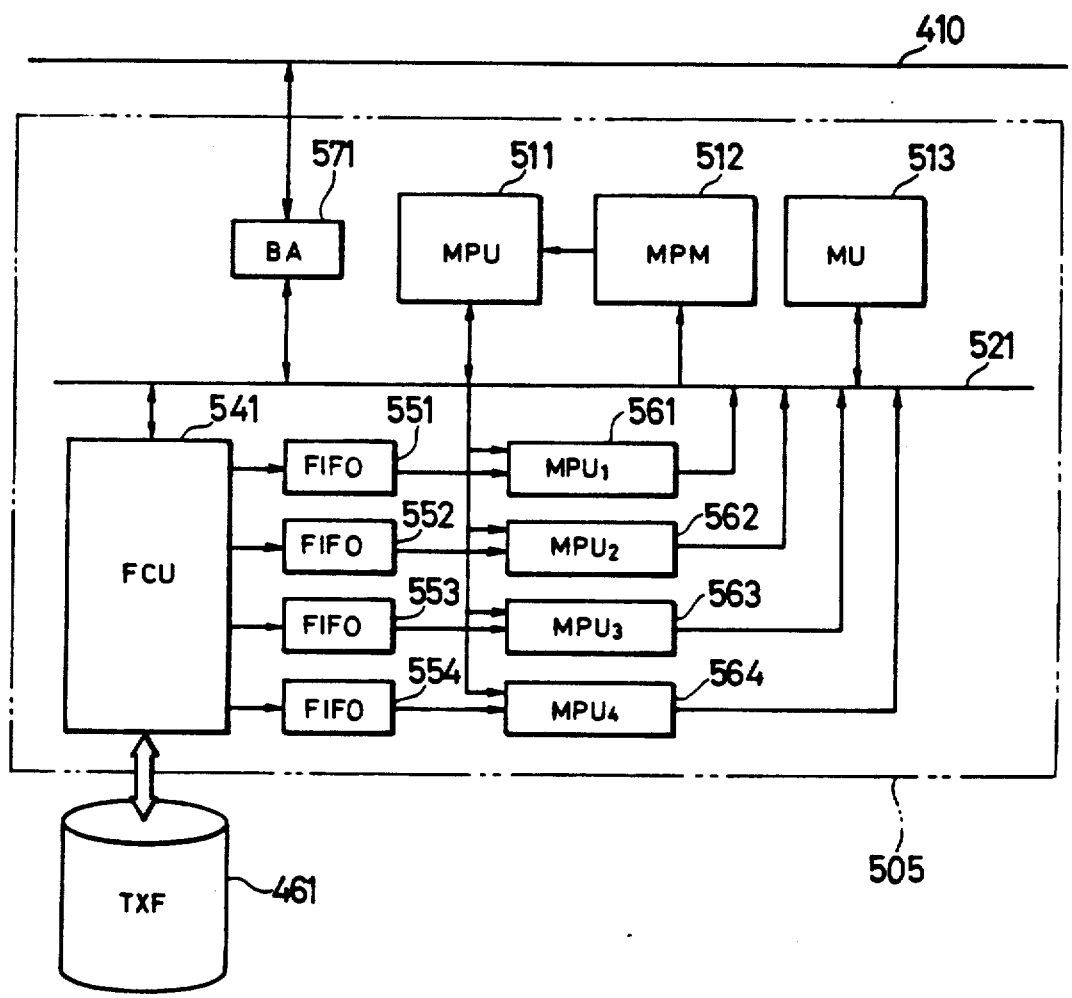
FIG. 21 is a configuration drawing of a flexible string matching circuit in a second embodiment.

A second illustrative example will be described, next. In the example, a configuration of the flexible string matching circuit 501 only is different. FIG. 21 is a configuration drawing of the flexible string matching circuit FSM in the second example.

In the drawing, a secondary storage unit (text file) 461 has a plurality of heads capable of reading a signal simultaneously, and in the example, data can be read out of the four heads simultaneously. The data is transmitted to four FIFO circuits 551 to 554 each by way of a file control unit FCU 541.

On the other hand, retrieval conditions sent from the upper subsystem 400 are interpreted by the microprocessor 551 and then transmitted to microprocessor units $MPU_1$ 561 to $MPU_4$ 564 including data memories.

Text data read out of the text file 461 are read to the microprocessor units 561 to 564 each by way of FIFO circuits 551 to 554. The microprocessor units search in parallel a predetermined partial character string from among four character strings (text data) and sends the result back to the microprocessor 511 by way of a data bus 521.

Since the other portions are equal to those of the first example, a description will be omitted.

- A third illustrative example will be then taken up for description. In the example, the hardware configuration is the same as those of the first and second examples, but the text searching is different.

In taking up the case where a document to be retrieved is narrowed down by means of a keyword or classification code according to a hierarchical retrieval method, the document screened in the process is generally unevenly distributed to a volume of the text file.

In the system of the example, a text data is stored redundantly in a plurality of text file volumes for multiplicity. According to a predetermined program, CPU 401 (FIG. 4) selects a volume to access so as to even the frequency of access to a plurality of volumes for the texts stored redundantly in the volumes. According to the system, all the flexible string matching circuits operate efficiently, and a high-speed retrieval can be realized as a whole.

In the above example, a multiplicity of the flexible string search circuit is 3 or 4, however, the multiplicity is not particularly limited in the system according to the invention.

Then, the text search is carried out of the whole document uniformly and so described hereinabove, however, information on the page boundary will be recorded in the text in a special symbol, and a page number successful in string matching can also be output as a matching result, the system of which is also included in the invention.

Further, the description has been given on an English text, however, the system can also be applied likewise to other languages.

Then, the text data is extracted through character recognition in the above example, however, the mode of a text content retrieval is apparently applicable to a text data inputted by hand, which is included in the invention.

Further, a system status has been described as illustrated in FIG. 4, however, it remains unchanged substantially in the case of miniature system or stand-alone system; which is also included in the invention. In particular, it is conceivable that a text file and an image file provided in another system be loaded to a small scale retrieval station, which is included in the invention.

Still further, it goes without saying that retrieval conditions can be combined through a logical operator or extended so as to retrieve the partial character string satisfying a relative positional relation. Particularly, a combinative high retrieval can be realized at high speed through postprocessing by outputting a presence of each of a plurality of partial character strings.

As described above, according to the system of the invention, a desired document can be retrieved at high speed by referring to the contents of the document text, and also retrieved efficiently from a conception which is not conceivable at the point in time of having registered the document. Particularly at the time of registration, there is no necessity for worrying excessively about what is suitable to put as a classification code or keyword. A retrieval precision can be enhanced consequently and a noise occurrence can be suppressed at the same time.

Further, a text can be retrieved at high speed by juxtaposing the text search subsystem internally. A high speed operation can be attained particularly by adding a string matching circuit at every reading heads.

In the case of a retrieval for a large scale document file, the text contents can be retrieved by decreasing documents to be retrieved according to a keyword and bibliographical items, thus realizing an efficient retrieval as a whole.

Then, for obtaining a text data from document images, a document recognition result must have been inspected in each occasion to correct errors in the prior art, however, no attendant is particularly required therefor according to the invention. The text content retrieval has not been substantially realized hitherto for the reason mentioned above, but an effective text content retrieval can be secured by the invention.

What is claimed is:

1. A document storage and retrieval system comprising:
   image file means for storing documents which are converted into digital document image data by a photo-electric conversion means and compression processed by an image processor;
   document recognition means, coupled to said image file means, for recognizing said documents and for generating full text data of said documents, said full text data including character code strings identified as a result of recognition of characters in said document, wherein said document recognition means outputs multiple candidates of character codes for a character not identified as a result of character recognition and stores said multiple candidates of character codes between predetermined special character codes in said character code strings between correctly identified characters at the location of said character not identified;
   text file means, coupled to said document recognition means, for storing said full text data;
   data base file means for storing bibliographic items and information which identifies said document image data stored by said image file means and said full text data of said documents stored by said text file means thereby correlating said bibliographic items to said information, said bibliographic items each including a title, an author's name or classification of a document; and
   retrieval means, coupled to said data base file means, said text file means, and said image file means, for searching whether a bibliographic item and a character code string input as a request for text content by an operator exists in said full text data of said documents stored by said text file means for outputting document image data corresponding to a document including said bibliographic item and said character code string requested by said operator, wherein said retrieval means searches said multiple candidates or character codes of each said character not identified in said full text data to locate a character code from said input character code string among said multiple candidates of character codes.

2. A document storage and retrieval system according to claim 1, wherein said document recognition means analyzes the structure of a document into a plurality of regions representing bibliographic items and generates character code strings for each of the items.

3. A document storage and retrieval system according to claim 1, wherein said bibliographic items includes input times when said documents were input to said system and stored in said image file means by an operator.

4. A document storage and retrieval system comprising:
   image file means for storing documents which are converted into digital document image data by a photo-electrical conversion means and compression processed by an image processor;
   document recognition means, coupled to said image file means, for recognizing said documents and for generating full text data of said documents, said full text data including character code strings identified as a result of recognition of characters in said documents, wherein said document recognition means outputs multiple candidates of character codes for a character recognition and stores said multiple candidates of character codes between predetermined special character codes in said character code strings between correctly identified characters at the location of said character not identified as result of
   text file means, coupled to said document recognition means, for storing full text data of said documents, said full text data including character code string representative of characters which exist in said documents as character codes, wherein said full text data is used for retrieving and said document image data is used for outputting;
   data base file means for storing bibliographic items and information which identifies said document image data stored by said image file means and said full text data of said documents stored by said text file means thereby correlating said bibliographic items to said information, wherein said bibliographic items each include a title, and author's name or classification of a document; and
   retrieval means, coupled to said data base file means, said text file means, and said image file means, for searching whether a bibliographic item and a character code string input as a request for text content by an operator exists in said full text data of said documents stored by said text file means and for outputting document image data corresponding to a document including said bibliographic item and said character code string requested by said operator, wherein said retrieval means searches said multiple candidates of character codes of each said character not identified in said full text data to locate a character code from said input character code string among said multiple candidates of character codes.

* * * * *